George P'Simer
James E. Blackburn
INVENTORS

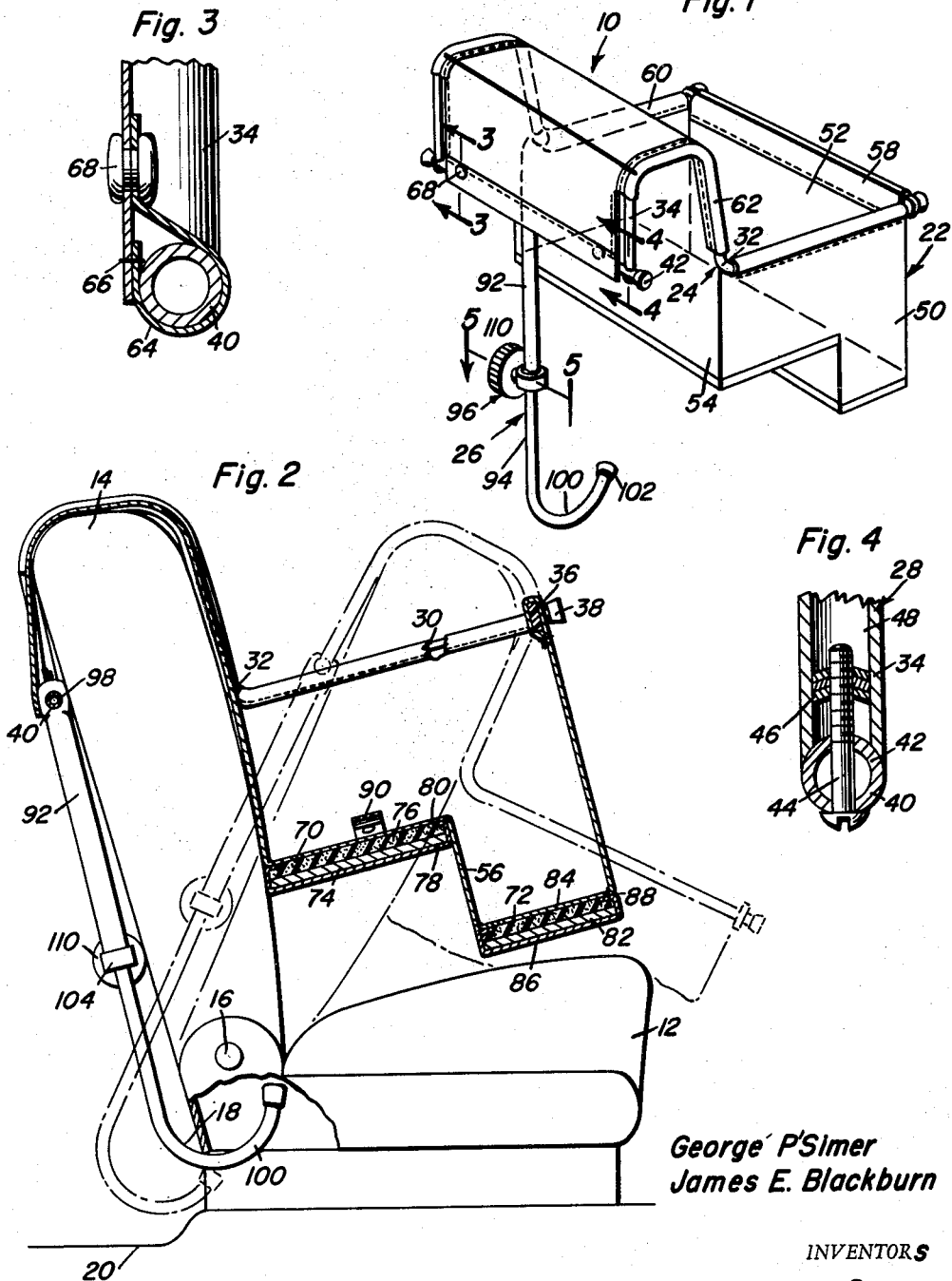

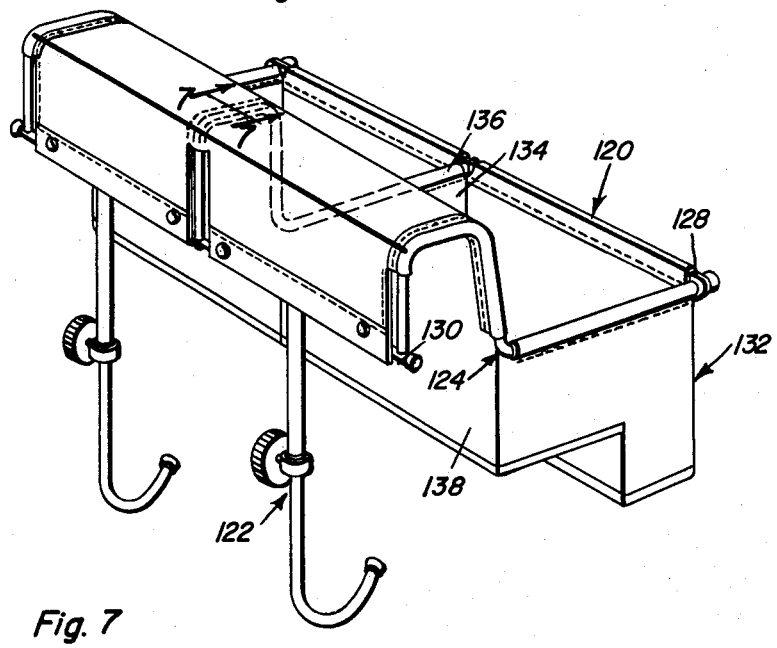
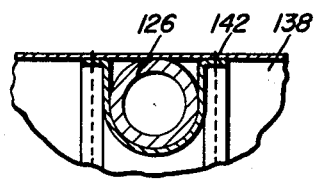
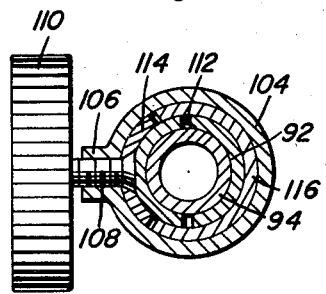
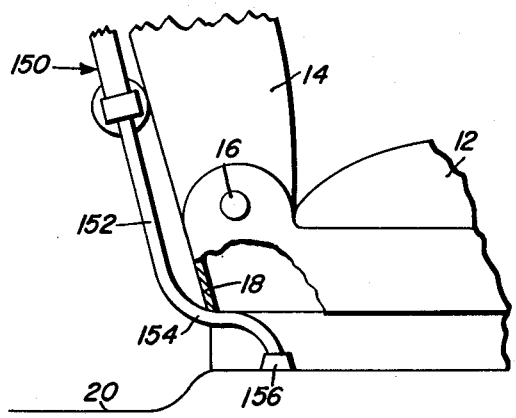
George P'Simer
James E. Blackburn
INVENTORS Aug. 11, 1964   G. P'SIMER ET AL   3,144,273
CAR SEAT FOR INFANTS Filed Nov. 22, 1961   3 Sheets-Sheet 3

BY *Clarence A. O'Brien*
*and Harvey B. Jackson*
Attorneys

United States Patent Office 3,144,273
Patented Aug. 11, 1964

3,144,273
CAR SEAT FOR INFANTS
George P'Simer and James E. Blackburn, both of Tampa, Fla., assignors to Safety Auto Baby Seat Company, Inc., Tampa, Fla., a corporation of Florida
Filed Nov. 22, 1961, Ser. No. 154,278
1 Claim. (Cl. 297—254)

The present invention generally relates to a car seat for infants or small children and more particularly to such a seat having a novel structural arrangement for introducing a safety factor which heretofore has not been accomplished.

As is well known, many car seats have been patented and are commercially available. The seats are usually provided with a pair of rear hook-like members engaging over the top edge of the seat, a frame connected with the hook-like members and a seat and fabric assembly suspended from the frame. While such devices work to a certain degree, they are especially unsafe when used with a passenger car having two doors and a split front seat in which the back of the front seat is split into two segments so that the segments may be individually pivoted forwardly for enabling passengers to have access to the rear seat of the automobile. When a presently available car seat is mounted on one part of the split seat back such as the passenger side, the weight of the car seat and the infant carried thereby will cause the segment of the split seat back to pivot forwardly in the event of sudden deceleration due to the forces of inertia. In view of this outstanding problem, the primary object of the present invention is to provide a car seat especially adapted for use with split type seats but also usable with a solid back seat with the invention having a novel anchor assembly mounted thereon for engagement with a stationary part of the vehicle to prevent forward pivoting or tilting movement of the segment of the split back on which the seat is mounted.

The present invention also facilitates safer operation of the vehicle since the operator of the vehicle need not now be concerned with holding the car seat and segment of the split back of the vehicle seat when decelerating or applying the brakes. When emergency situations arise, all of the operator's attention should be given to proper and safe operation of the vehicle without him having to use one hand or arm to hold the split segment of the seat back in place which is a normally required procedure when a conventional type of car seat is used on a split back seat.

Another problem existent in conventional car seats is the tendency of the car seat to lift off of the vehicle seat when the infant is being lifted out of the car seat. This is usually caused by the infant either grasping the car seat or having his legs come into engagement with a portion of the car seat frame. This presents a rather awkward condition since the child usually has to be placed on the front seat of the vehicle and the car seat extricated and returned to its normal position on the top edge of the vehicle seat. With the anchor of the present invention, the car seat will be retained in place on the vehicle seat and the child may be easily placed in the car seat and easily removed without any problem of the car seat becoming dislodged.

Still another object of the present invention is to provide a car seat having an anchor especially adapted for use with a split back seat in which the anchor has means readily accessible to the operator of a vehicle which may render it extensible to enable normal pivotal movement of the segment of the split back on which the car seat is mounted, such means being not only readily accessible but positive in locking the anchor rigidly and securely in adjusted position.

Conventional car seats also have a crotch strap or leg receiving openings which enable the legs of an infant to project out forwardly of the frame. This quite often results in an uncomfortable condition for the infant and also chafing of the legs and the like. Further, the conventional type of construction enables a child to swing forwardly over the front frame member in the event of extremely rapid deceleration. In the present invention, these problems have been overcome by providing a complete enclosure for the lower portion of the child including an L-shaped fabric assembly having a seat and a footboard incorporated therein so that as the child is placed on the seat, his feet normally will be on the footboard thereby eliminating any possible chafing of his legs, providing him with more freedom of movement and yet providing a safety factor in that upon forward movement of the child in relation to the seat, the child will engage the front portion of the enclosure and actually slide down into the area of the footboard thus more securely retaining the child from flying forwardly in relation to the vehicle due to forces of inertia in the event of an extremely sudden stop.

Still another feature of the present invention is the provision of a construction in a vehicle car seat which readily lends itself to construction as a single unit or as a twin unit for carrying two small children either of the same age or near the same age.

Yet another important object of the present invention is to provide a car seat in accordance with the preceding objects which is quite simple in construction, easy to install, safe in use, easy to use, dependable and long lasting and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the car seat for infants of the present invention;

FIGURE 2 is a vertical sectional view illustrating the arrangement of the car seat when installed on the split back seat illustrating the manner of elongation of the anchor for enabling the spit segment of the vehicle seat to pivot forwardly in the usual manner;

FIGURE 3 is a detailed sectional view taken substantially upon a plane passing along section line 3—3 of FIGURE 1 illustarting the manner in which the fabric cover member is attached to the rear frame rail;

FIGURE 4 is a detailed sectional view taken substantially upon a plane passing along section line 4—4 of FIGURE 1 illustrating the connection between the rear frame rail and the side frame rails;

FIGURE 5 is a detailed sectional view taken substantially upon a plane passing along section line 5—5 of FIGURE 1 illustrating the construction of the clamp for locking the telescopic anchor in adjusted position;

FIGURE 6 is a perspective view of a twin or double car seat assembly incorporating the principles of the present invention therein;

FIGURE 7 is a detailed sectional view taken substantially upon a plane passing along section line 7—7 of FIGURE 6 illustrating the connection of the fabric covering to the central frame member;

FIGURE 8 is a fragmental side elevational view illustrating another manner of constructing the anchor for engagement with a stationary part of the vehicle;

Figure 9:
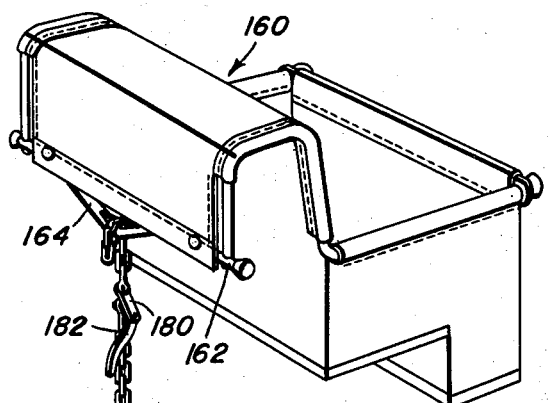
FIGURE 9 is a perspective view of another modified form of the present invention including an adjustable chain extending from the bottom hook to the car seat.

Referring now specifically to the drawings, the numeral 10 generally designates the car seat for infants of the present invention for use in conjunction with the front seat 12 of a passenger car or vehicle having a split back including two segments 14 in relation to the front seat 12. The split back segments 14 are pivotally supported by some conventional type of pivot pin or bolt 16 and the seat 12 is provided with a stationary rear frame portion 18 spaced above the floor 20. The vehicle seat is, of course, of conventional construction and forms no part of the present invention and is described for the purpose of relating the car seat of the present invention thereto since the relationship of certain parts of the car seat with the structure of the split back vehicle seat is essential to the present invention.

The car seat 10 includes a fabric cover 22 supported on a framework 24. The fabric cover 22 may be of any suitable construction and may be plasterized or formed of any suitable long lasting durable material with the coloring or other decorative indicia appearing thereon being optional. For example, a corduroy material may be employed of solid color such as pink, blue, yellow, green or the like or any other suitable coloring may be employed. Attached to the frame 24 is an anchor assembly generally designated by the numeral 26 for preventing the segment 14 from pivoting forwardly when the car seat is being occupied in a manner described hereinafter.

The frame 24 includes a pair of side rails 28 each including a forwardly extending generally horizontally disposed forward end portion 30 terminating at its rear in a substantially 90° angle 32 integral with an upwardly extending, rearwardly extending and downwardly extending generally inverted U-shaped portion 34 which defines a downwardly opening enlarged hook for engaging over the edge of the car seat back 14 as illustrated in FIGURE 2. Extending transversely between the forward ends of the forwardly extending portions 30 is a transverse bar 36 of colored plastic material or the like which is somewhat flexible as far as lateral deflection forwardly and rearwardly is concerned but is substantially rigid insofar as vertical deflection is concerned. The ends of the bar 36 slide over the ends of the forwardly extending portions 30 of the side rails 28 and the bar 36 is retained in place by end caps 38 mounted on the forward ends of the forwardly extending portions 30 of the frame. The end caps 38 may be rigidly affixed in position by a friction fit or by using a suitable bonding material, adhesive or the like.

The bottom rear ends of the hook shaped portions 34 are interconnected by a transverse rear member 40 which has the terminal ends thereof extending outwardly beyond the side rails or frame members 28 and provided with end caps 42 thereon similar to the end caps 38. Such end caps may be plastic material of any suitable color to prevent any possible injury and also to prevent any possible damage to the vehicle seat.

As illustrated in FIGURE 4, the bottom end of the downwardly extending portion of the inverted hook shaped portion 34 is shaped to conform to the surface of the transverse rod 40 as indicated by the numeral 42. An elongated screw threaded fastener 44 extends transversely of the rod 40 and longitudinally up into the lower end of the inverted hook shaped portion 34 and is in screw threaded engagement with a plurality of serrated washers 46 or the like which may be pushed upwardly into the tubular interior 48 of the lower end of the portion of the inverted hook shaped portion 34 and will self-lock themselves in position thus enabling the rigid connection of the transverse rod 40 with the side frame rails 28 of the frame 24. The side frame rails 28 as well as the transverse frame rail 40 may be of hollow construction such as tubular aluminum members which are usually formed in shape and may be anodized to any suitable finish. In lieu thereof, a chromium tubular structure may be used and in any event, the strength and rigidity thereof will be entirely adequate to support a child that would normally use the car seat.

The cover 22 includes side panels 50, the front panel 52, the rear panel 54 and a bottom panel 56. The front panel 52 is provided with a hem 58 receiving the bar 36. The upper edges of the side panels 50 each have a hem 60 receiving the forwardly extending portion 30 of the side frame rails 28. The back panel 54 conforms generally with the shape of the inverted hook shaped portion 34 and each side edge thereof has a hem 62 receiving a major portion of the inverted hook shaped portion 34 but which terminates above the lower end thereof. The free edge of the back panel 64 is provided with a hem forming strap 64 secured thereto as by stitching 66 at one edge and having snap fastener assemblies 68 securing the other edge thereof to the transverse rod 40 thus enabling disengagement of the transverse rod 40 from the back panel 54 thereby enabling the fabric to be removed from the frame if desired for cleaning, laundering or the like. Also, this construction enables the anchor assembly 26 to be connected with the transverse bar 40 in a manner described hereinafter.

The bottom edge of the side panel 60 is generally Z-shaped and the bottom panel 56 is also generally Z-shaped and provided with a seat forming area 70 and a foot receiving area 72. The seat forming area 70 is provided with a rigid board 74 and a layer of cushioning material 76 such as foam rubber, foam plastic or any suitable padding or the like. The board 74 and the cushioning material 76 is retained in place by a retaining fabric panel 78 which extends thereunder and has the ends thereof secured to the seat forming portion 70 as by stitching 80. The foot receiving portion 72 also has a rigid board 82 therein and a layer of cushioning material 84 all retained in place by a retaining fabric member 86 secured in place on the foot receiving area 72 by stitching 88 or the like. A belt or strap 90 is provided across the seat forming area 70 for extending across the lap region of a child for retaining him in seated position in the seat and preventing him from standing up. This strap has any suitable buckle means and may be constructed of any suitable material such as plastic or the like. When in use as illustrated in FIGURE 2, the child normally positioned in the car seat forwardly and downwardly into the foot receiving area 72 in the event of sudden deceleration. Also, the flexibility of the fabric members enables the child to have a certain freedom of movement which is also true since the foot receiving area 72 is unobstructed thus enabling him to move his feet and otherwise assume a most comfortable position.

The anchor assembly 26 includes an upper tubular member 92 and a lower tubular member 94 telescoped into the upper tubular member and secured in place by an adjusting lock mechanism generally designated by the numeral 96. The upper end of the upper tubular member 92 is flattened and provided with an aperture 98 receiving the transverse rod 40 whereby the upper tubular member 92 may slide on the rod 40 and also pivot thereon. The lower end of the lower tubular member 94 is provided with a reverse bend or hook portion 100 terminating in an end cap 102 which hook portion is adapted to engage under a stationary portion of the seat frame 18 of the vehicle as illustrated in FIGURE 2 whereby forward pivoting movement of the segment 14 of the seat back will be prevented when the anchor 26 is adjusted and locked in position with the hook end 100 engaged under the rigid stationary portion 18 of the vehicle seat 12.

The clamp mechanism includes an annular ring 104 having a boss 106 extending radially therefrom receiving a screw threaded member 108 having a plastic hand wheel 110 or the like rigidly affixed thereto. The smaller lower tubular member 94 is received in the upper tubular member 92 which is provided with longitudinal diametric slits 112 to enable the upper tubular member to collapse into clamping engagement with the lower tubular member. Journaled on the inner end of the screw threaded member 108 is an arcuate saddle 114 engaging a portion of the external surface of the upper tubular member 92. An arcuate insert 116 is provided between the remainder of the periphery of the member 92 and the annular retaining ring 104 thus preventing any substantial deformation of the upper tubular member 92. Thus, when the screw threaded member 108 is moved inwardly or outwardly, the saddle 114 will effectively clamp or unclamp the upper tubular member 92 in relation to the lower tubular member 94 thus enabling the lower tubular member 94 to move downwardly so that the hook end 100 thereof is free to move in relation to the vehicle seat frame 18 either by coming out from under the vehicle seat frame or by being able to move in relation thereto in order that the back segment 14 may move forwardly to the dotted line position illustrated in FIGURE 2.

FIGURES 6 and 7 illustrate a modified form of the present invention generally designated by the numeral 120 which may be considered a twin unit or double unit in that it can support two small children either of the same age such as twins or two children of different ages both of which are of an age that would normally use such a seat.

In this construction, two anchor assemblies 122 are used each of which is identical to the anchor assembly 26 illustrated in FIGURE 1. Side frame rails 124 are used and an intermediate frame rail 126 is employed each of which is the same in construction as the side frame rails 28 employed in FIGURE 1. A single elongated bar 128 is employed which bridges all three frame rails 124 and 126 and which is secured thereto in the same manner. Also, an elongated rear rod 130 is employed of similar construction to the rod 40 except that it bridges all three frame rails 124 and 126.

The fabric supporting structure is generally designated by the numeral 132 and is substantially the same in configuration as employed in FIGURE 1 except that an intermediate common wall 134 is provided which divides the interior of the car seat into two compartments. The upper edge of the partition wall 134 is provided with a hem 136 engaging over the forwardly extending portion of the intermediate frame rail 126. The portion of the back panel 138 which extends over the top edge of the seat is provided with a loop forming strap 140 attached thereto by stitching 142 for receiving the adjacent portion of the intermediate frame rail 126.

FIGURE 8 illustrates a modified form of anchor assembly generally designated by the numeral 150 which includes a lower tubular member 152 equivalent to the lower tubular member 94. However, in this form of the invention, the lower end of the tubular member 152 is bent forwardly as indicated by the numeral 154 and then turns downwardly and terminates in an end cap 156 forming a foot which may be extended into rigid engagement with the floor 20 of the vehicle to prevent pivotal movement of the seat back segment 14.

Thus, the essential features of the present invention reside in the anchor assembly for selectively preventing forward pivotal movement of the split back segment of the seat of the vehicle with it being pointed out that the hand wheel faces inwardly toward the operator so that the operator may merely reach over the top edge of the back of the front seat and operate the clamp mechanism thus enabling the anchor to be rendered ineffective so that the seat back may pivot in the usual manner to provide access to the rear of the vehicle. Further, the detachment of the components formed by the transverse rod 40 or the transverse rod 130 enables the device to be readily shipped and stored in a relatively compact manner thus maintaining the car stop handling at a minimum.

Figure 10:
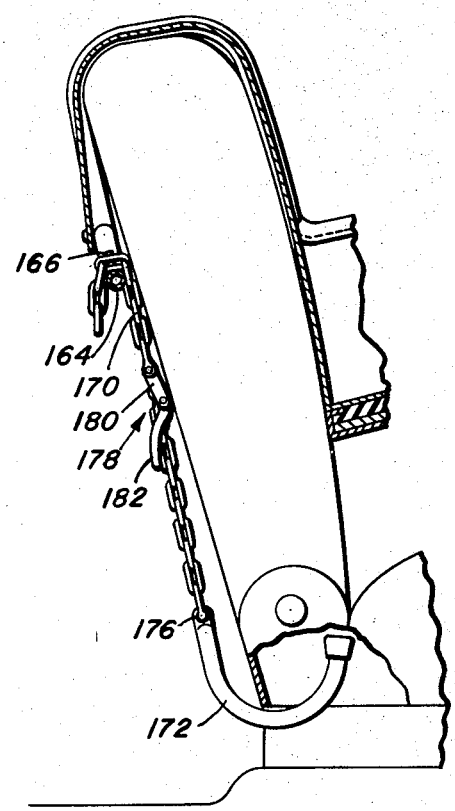
FIGURE 10 is a sectional view illustrating the relationship of the components of the construction of FIGURE 9.
Figure 11:
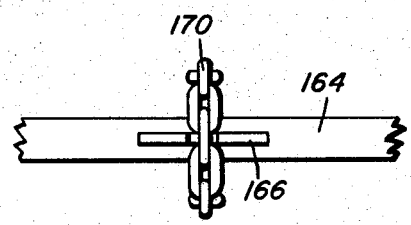
FIGURE 11 is a detailed plan view of the structure for retaining the chain in longitudinally adjusted position on the car seat.
Figure 12:
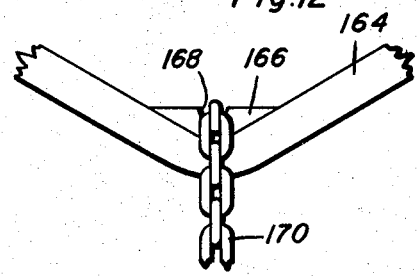
FIGURE 12 is an elevational view of the construction of FIGURE 11.

FIGURES 9 through 12 illustrate a modified form of the invention generally designated by the numeral 150 and the seat structure and framework is substantially the same as that disclosed in FIGURE 1. There is provided a rear transverse bar 162 equivalent to the bar 40 which has a pair of depending members 164 attached thereto which form substantially a V-shaped configuration. At the bottom apex of the V-shaped depending portion defined by the members 154, is a pair of lugs 166 defining a vertical slot 168 having diverging side edges.

The lugs 166 engage the length of a chain 170 whereby the chain may be adjusted in relation to the lugs 166 in an obvious manner so that the links of the chain are disposed vertically between the side edges 168 with the adjacent cross link preventing the movement of the chain through the slot 168 thus locking the chain in adjusted position.

The bottom end of the chain 170 is provided with a rigid hook 172 for hooking under the stationary part of the seat frame 174 in the same manner as the hook 100. The upper end of the hook 170 is provided with a flattened portion 176 provided with a suitable aperture to which the chain 170 is attached. Also provided in the chain 170 is an overcenter take-up mechanism generally designated by the numeral 178 which may be of any suitable construction and includes a link 180 pivotally attached to one section of the chain and an arcuate handle 182 pivotally attached to the other section of the chain with the link 180 pivotally attached to the handle 182 in such a manner that upon pivotal movement of the handle 182 from a position alongside of the upper chain to a position alongside of the lower chain, the chain 170 will be effectively shortened thus rigidly clamping the hook 170 to the seat frame 174. This also provides an overcenter relationship so that the handle 182 will engage the lower section of the chain in such a manner that it will not pass beyond the lower section of the chain with the centers related in the manner illustrated in FIGURE 10 thus providing an automatically locking chain take-up device.

This device operates in substantially the same manner as the other devices except that the chain may be effectively elongated by releasing the chain take-up a sufficient length to enable the seat to pivot forwardly for egress and ingress of passengers in relation to the back seat of the vehicle with the chain take-up enabling a simple and rapid locking element for locking the seat in upstanding position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A car seat for infants for mounting on a pivotal segment of a split back vehicle seat comprising a supporting frame including rearwardly disposed downwardly opening hook-shaped members engaging over the top edge of the pivotal segment of the seat back and a forwardly extending portion projecting from the front surface of the seat back, a flexible supporting assembly for an infant attached to said frame, an anchor means attached to the rear portion of the frame and adapted to extend downwardly for engagement with a stationary part of the vehicle to prevent forward pivotal movement of the pivotal segment of the seat back thereby preventing forward swinging movement of the car seat in the event of a sudden deceleration of the vehicle, said anchor means including a rigid longitudinally telescopic member, clamp means releasably retaining the telescopic member in longitudinally adjusted relation thereby enabling the anchor means to be rendered ineffective for permitting normal pivotal movement of the pivotal segment of the seat back for providing normal access to the rear of the passenger compartment of the vehicle, said clamp means for the telescopic member including a manually operated member disposed towards the operator's side of the vehicle whereby the operator may easily have access to the same for actuation of the clamp means for rendering the anchor means telescopically extensible for enabling the pivotal segment to pivot about its pivot axis, said frame including a pair of side rails, a transverse bar interconnecting the forward end of said side rails, said transverse bar being of shape sustaining plastic material and of rectangular cross-sectional configuration with a major dimension thereof disposed vertically thereby providing flexibility in a horizontal and rearward direction while providing vertical rigidity thereby cushioning any impact of an infant against the transverse bar but yet providing substantial vertical rigidity, said frame also including a rear transverse bar interconnecting the rear end portions of said rails, the rear end portions of said rails being hollow, and screw-threaded members extending transversely of the rear transverse bar and into the hollow interior of the rear end portions of the rails, anchor members disposed within the rear end portions of the rails for engagement by the screw-threaded members thereby rigidly and detachably securing the rear transverse bar to the rear end portion of the side rails, said support suspended from the frame including a fabric member having side panels, a front panel, a rear panel and a bottom panel all suspended from the frame with the front panel being suspended from the front transverse bar and the rear panel being attached to the rear transverse bar, said bottom panel having a seat forming area and a foot receiving area spaced vertically from each other with the foot receiving area being disposed forwardly of the seat forming area, the seat forming area and the feet receiving area each including a rigid board and padding material thereon for defining the areas and forming means for sustaining the shape of the areas, the feet receiving area defining means for receiving the major portion of a child disposed in said seat in the event of sudden deceleration of the vehicle and in the event the child moves forwardly in relation to the seat, a strap extending across the seat forming area for retaining a child in seated position on the board, said rear panel being detachably connected to said rear transverse bar for enabling removal of the rear transverse bar, said clamp means including a ring encircling the sections defining the telescopic member with the outer section of the telescopic member being split, and a pressure ring engaging the split section of the telescopic member and providing a substantially equalization of clamping pressure.

References Cited in the file of this patent

UNITED STATES PATENTS

| | | |
|---|---|---|
| 1,742,822 | Olson | Jan. 7, 1930 |
| 2,546,790 | Shook | Mar. 27, 1951 |
| 2,664,140 | Kindelberger | Dec. 29, 1953 |
| 2,690,790 | Linden | Oct. 5, 1954 |
| 2,695,048 | Jenner | Nov. 23, 1954 |
| 2,740,642 | Atwood | Apr. 3, 1956 |
| 2,815,513 | Tilson et al. | Dec. 10, 1957 |
| 2,818,274 | Manos | Dec. 31, 1957 |
| 2,954,070 | Moeller | Sept. 27, 1960 |

FOREIGN PATENTS

| | | |
|---|---|---|
| 620,512 | Canada | May 23, 1961 |
| 876,586 | Germany | May 15, 1953 |
| 1,170,323 | France | Sept. 22, 1958 |